(12) United States Patent
Campbell et al.

(10) Patent No.: US 8,613,480 B1
(45) Date of Patent: Dec. 24, 2013

(54) CHILD RESTRAINT SYSTEM

(75) Inventors: Corey A. Campbell, Wadsworth, OH (US); David E. Campbell, Westfield Center, OH (US); Troy Daniel Mason, Brownsburg, IN (US); Matthew Scott Graham, Noblesville, IN (US)

(73) Assignee: FirstSEAT, LLC, Pebble Beach, CA (US)

( * ) Notice: Subject to any disclaimer, the term of this patent is extended or adjusted under 35 U.S.C. 154(b) by 64 days.

(21) Appl. No.: 13/229,906

(22) Filed: Sep. 12, 2011

Related U.S. Application Data

(60) Provisional application No. 61/381,670, filed on Sep. 10, 2010.

(51) Int. Cl.
*B60N 2/26* (2006.01)
*B60N 2/28* (2006.01)
*B60N 2/42* (2006.01)

(52) U.S. Cl.
USPC ..................................... 297/253; 297/256.16

(58) Field of Classification Search
USPC ............................................ 297/253, 256.16
See application file for complete search history.

(56) References Cited

U.S. PATENT DOCUMENTS

| | | | | |
|---|---|---|---|---|
| 5,052,750 | A * | 10/1991 | Takahashi et al. | ... 297/256.16 X |
| 5,277,472 | A * | 1/1994 | Freese et al. | ......... 297/256.16 X |
| 7,300,113 | B2 * | 11/2007 | Baloga et al. | ........ 297/256.16 X |
| 7,926,874 | B2 * | 4/2011 | Hendry | .................... 297/256.16 |
| 7,988,230 | B2 * | 8/2011 | Heisey et al. | ......... 297/256.16 X |
| 8,226,162 | B2 * | 7/2012 | Campbell et al. | ......... 297/253 X |
| 8,262,161 | B2 * | 9/2012 | Fritz et al. | ..................... 297/253 |
| 8,322,788 | B2 * | 12/2012 | Williams et al. | ......... 297/256.16 |
| 2001/0004163 | A1 * | 6/2001 | Yamazaki | ................ 297/256.16 |
| 2010/0090509 | A1 * | 4/2010 | Balensiefer et al. | .......... 297/253 |

* cited by examiner

*Primary Examiner* — Rodney B White
(74) *Attorney, Agent, or Firm* — Renner, Kenner, Greive, Bobak, Taylor & Weber

(57) ABSTRACT

A child restraint system for use in a vehicle having improved vehicle seat belt anchoring mechanisms and an improved reclining mechanism. The vehicle seat belt anchoring mechanisms include a lap belt anchoring rod that is pivotable to facilitate the routing of the lap belt independent of the shoulder belt of the vehicle restraint system. The shoulder belt anchor member is located higher on the seat, and includes an anchor member received in a channel in the seat back. The recline mechanism of the child restraint system includes a recline plate that is connected to the rigid latch members. Reclining of the seat body results in movement of the rigid latch members to allow room between the seat body and the vehicle seat, thereby allowing adjustment of the recline angle of the seat without necessitating removal of the seat from the vehicle.

26 Claims, 18 Drawing Sheets

CHILD RESTRAINT SYSTEM

This application claims priority of U.S. Provisional Application Ser. No. 61/381,670 filed Sep. 10, 2010, which is incorporated herein by reference in its entirety.

TECHNICAL FIELD

This invention relates to a child restraint system for use in automobiles. More particularly, this invention relates to such a child restraint system having improved vehicle belt anchoring systems and an improved reclining mechanism.

BACKGROUND ART

Child restraint systems for use in automobiles have been designed to include a variety of features. Many of these features relate to either improved safety or securing of the seat or increased convenience and ease of use of the child restraint system. Specifically, one area of focus within the relevant market is the anchoring mechanism used to secure the child restraint system in a vehicle. Another common feature in child restraint systems is the ability to recline the seat relative to the vehicle seat upon which it rests. Despite an abundance and variety of child restraint systems available on the market, there is still significant room for improvement in the areas of safety and convenience.

Many child restraint systems utilize the vehicle restraint belt to anchor the child restraint system into the vehicle. Typically, both the shoulder belt and lap belt of the vehicle restrain system are routed together through openings in the base of the child restraint system to anchor it into the vehicle. These vehicle seat belt routing systems suffer from several disadvantages. First, the vehicle seat belt must be routed through an opening, which makes installation difficult and time consuming. It is often hard to correctly route the vehicle seat belts when the child restraint system is positioned within the vehicle since the belt path is on the rear of the child restraint system base. Second, the location of the anchor point on the child restraint system in such routing systems is low on the child restraint system, and therefore does not provide optimum performance and resistance against movement of the seat.

Many child restraint systems are also provided with a recline feature, which allows the seat to be reclined relative to the vehicle seat that it sits on. This feature can be important because many vehicle seats are angled to provide a comfortable seating surface for an adult passenger. Therefore, in order to orient the child restraint system in the proper position, it may be necessary to adjust how far the seat is reclined relative to the base. Conventional child restraint systems include reclining mechanisms that require that the seat be removed from the vehicle before adjustments to the recline mechanism can be made. This is problematic in that it requires the removal of the anchoring system and, once the recline mechanism of the seat has been adjusted, reinsertion of the car seat into the vehicle. As discussed above, removing and installing the child restraint system can be difficult and time consuming, making the adjustment of the recline feature also difficult and time consuming.

Thus, the need exists for a child restraint system that alleviates one or more of these deficiencies of the prior art.

DISCLOSURE OF THE INVENTION

It is thus an object of one aspect of the present invention to provide a child restraint system for use in a vehicle that includes a vehicle lap belt routing system that allows for easy positioning of a vehicle seat belt.

It is an object of another aspect of the present invention to provide a child restraint system that includes improved shoulder belt anchor members that allow for easy routing of a vehicle shoulder belt and provides improved resistance against movement of the child restraint system.

It is an object of another aspect of the present invention to provide a child restraint system having a recline mechanism that allows the recline angle of the restraint system to be adjusted without removing the system from a vehicle.

These and other objects of the present invention, as well as the advantages thereof over existing prior art forms, which will become apparent from the description to follow, are accomplished by the improvements hereinafter described and claimed.

In general, a child restraint system made in accordance with the concepts of the present invention includes a seat body having a seat bottom and a seat back, and first and second laterally spaced anchor rods carried by the seat back. The anchor rods are rotationally movable between a first use position and a second routing position to facilitate routing of a vehicle lap belt around the anchor rods.

In accordance with at least one aspect of the present invention, the child restraint system includes a seat body having a seat bottom and a seat back, and a recess provided in the seat back. An anchor member is carried by the seat back and is positioned in the recess, and the anchor member is adapted to receive a vehicle shoulder belt to secure the child restraint system within a vehicle.

In accordance with at least one aspect of the present invention, the child restraint system includes a base, a seat body having a seat bottom and a seat back, and a recline mechanism that allows repositioning of the seat body relative to the base between a reclined position and an upright position. The child restraint system also includes first and second adjustable rigid latch members extending from the rear of the base, the rigid latch members being adapted to be secured to vehicle anchors. The recline mechanism includes a base plate and a recline plate movable relative to the base plate. Movement of the recline plate relative to the base plate causes repositioning of the seat body relative to the base.

In accordance with at least one aspect of the present invention, the child restraint system includes a base; a seat body having a seat bottom and a seat back; and first and second laterally spaced anchor rods carried by the seat back, the anchor rods being movable between a first use position and a second routing position to facilitate routing of a vehicle lap belt around the anchor rods. The child restraint system also includes a recess in the seat back and an anchor member carried by the seat back and positioned in the recess, the anchor member having a first leg, a second leg oriented generally parallel to the first leg, and a hook portion connecting the first and second legs, the anchor member adapted to receive a vehicle shoulder belt thereon. The child restraint system further includes a recline mechanism that allows repositioning of the seat body relative to the base between a reclined position and an upright position; and first and second adjustable rigid latch members extending from a rear of the base, the rigid latch members adapted to be secured to vehicle anchors. The recline mechanism includes a base plate and a recline plate movable relative to the base plate. Movement of the recline plate relative to the base plate causes repositioning of the seat body relative to the base.

A preferred exemplary child restraint system according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
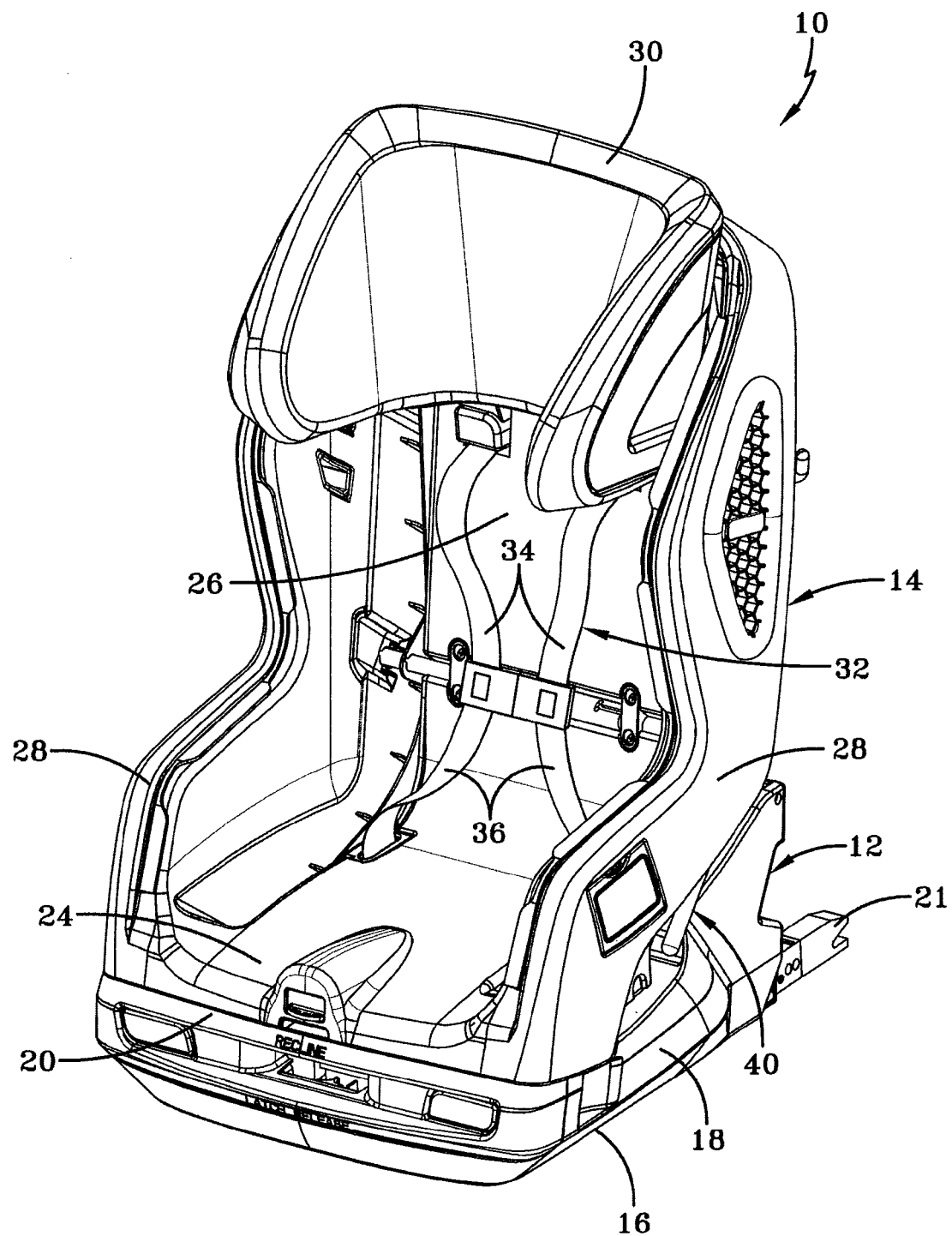
FIG. 1 is a perspective view of a child restraint system according to the concepts of the present invention.

A child restraint system made in accordance with the present invention is indicated generally by the numeral 10. Child restraint system 10 includes a base 12 and a seat body 14 secured to the base. Base 12 includes a generally planar bottom 16 adapted to rest on the seat of a vehicle, opposing sidewalls 18, a front surface 20, and rigid latch members 21. Seat body 14 includes a seating surface 22 defined by a seat bottom 24 and a seat back 26, opposing seat sidewalls 28 and a headrest 30. The seat body includes a frame 31 that forms and supports seating surface 22, seat bottom 24, seat back 26, sidewalls 28, and headrest 30.

Child restraint system 10 is adapted to be secured in a vehicle, and is configured to restrain a child therein. A harness system 32 is provided to safely secure the child within child restraint system 10, and includes shoulder belts 34 and lap belts 36. A vehicle seat belt securing system may also be provided to secure the child restraint system in a vehicle not equipped with LATCH anchors. The vehicle seat belt may be any such system known to those skilled in the art.

Molded plastic shell cover pieces are provided on the exterior of child restraint system 10 to improve the aesthetic appearance of the seat, and to hide and protect the working components of the seat. The outer shell may be modified or adapted without deviating from the scope of the present invention. The novel aspects of the child restraint system will be described in greater detail below.

Child restraint system 10 includes a vehicle lap belt routing system that allows only the lap belt of the vehicle restraint system to be routed through the vehicle belt path and used to anchor the seat into the vehicle. Routing the vehicle lap belt only through the belt path provides for easier belt tensioning to secure the car seat as the shoulder belt is not present in the vehicle belt path. The vehicle lap belt routing system includes an anchor rod 40 extending from each side wall 28 of seat body 14. Anchor rod 40 includes a first portion 42 on the exterior of side walls 28, and a second portion 44 extending generally orthogonally from first portion 42 in toward the center of seat body 14.

First portion 42 of anchor rod 40 extends downward and toward the front of child restraint system 10 so as to provide an ideal anchoring position for the vehicle lap belt 46. However, it will be appreciated by those skilled in the art that the orientation of first portion 42 of anchor rod 40 may vary while still providing the intending anchoring function. An anchor rod stop 48 is provided on each side wall 28 and is adapted to limit rearward movement of the vehicle lap belt on the anchor rod 40. Anchor rod stop 48 is generally U-shaped having an open end to allow first portion 42 of anchor rod 40 to extend therethrough.

Second portion 44 of anchor rod 40 extends into side wall 28 and through a bracket 50 of the frame 31 of the child restraint system 10. Bracket 50 secures anchor rod 40 to the frame 31 of the child restraint system 10 while still allowing both lateral and rotational movement of the anchor rod, which will be discussed in greater detail below. The end of second portion 44 includes a pin 52 extending diametrically across and protruding therefrom on at least one side. Second portion 44 of anchor rod 40 is received in a sleeve 54 positioned in a recess of seat back 26. Sleeve 54 includes laterally spaced slots 56 at each end thereof, each slot adapted to receive an end of second portion 44 and a pin 52. Slots 56 are generally T-shaped and include a laterally extending portion 58 and a circumferentially extending portion 60. A retaining clip 62 is secured to seat back 26 adjacent to each end of sleeve 54 by one or more fasteners 64.

Figure 4:
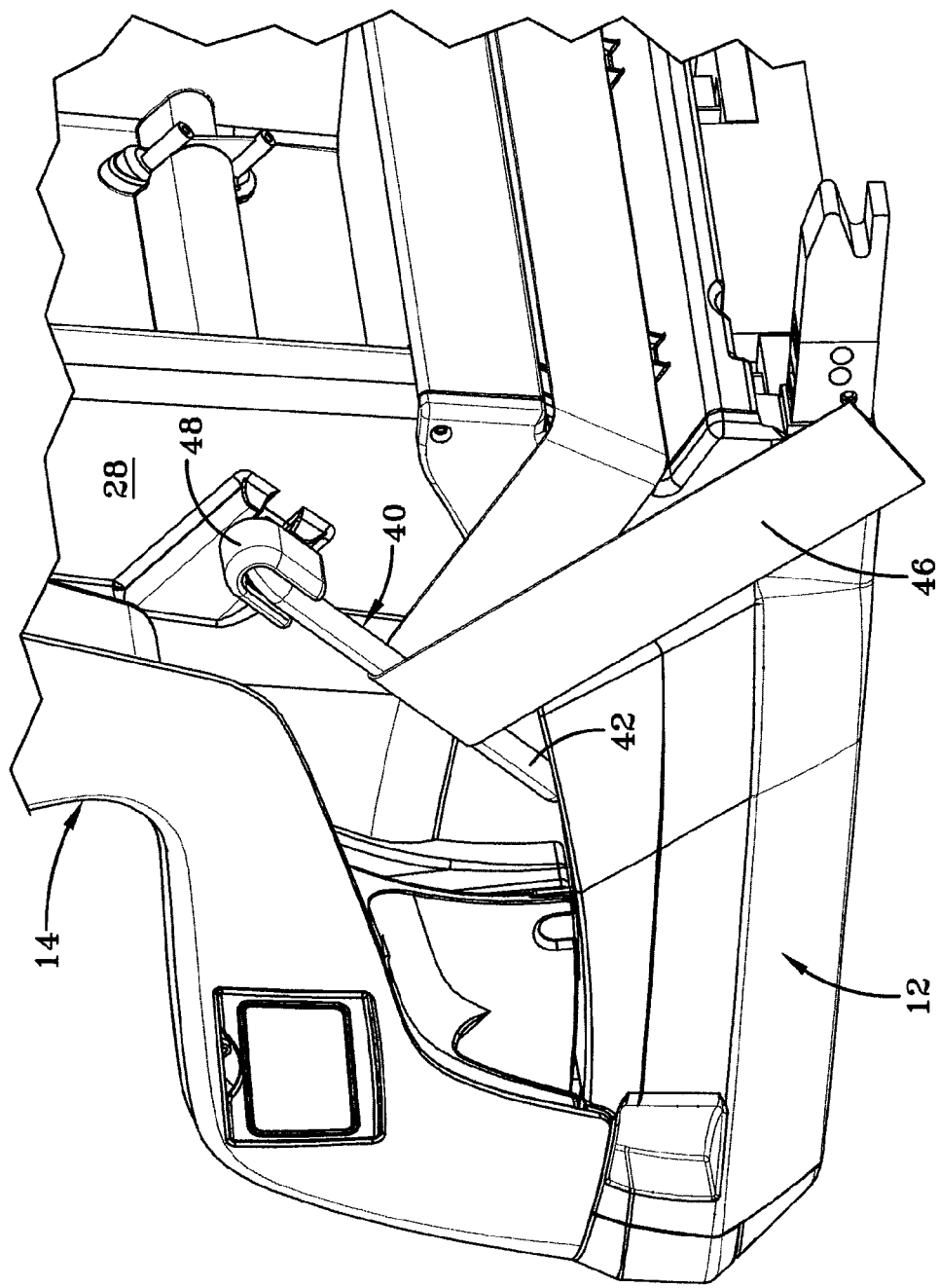
FIG. 4 is a close up perspective view of the child restraint system showing a lap belt anchor rod.
Figure 4A:
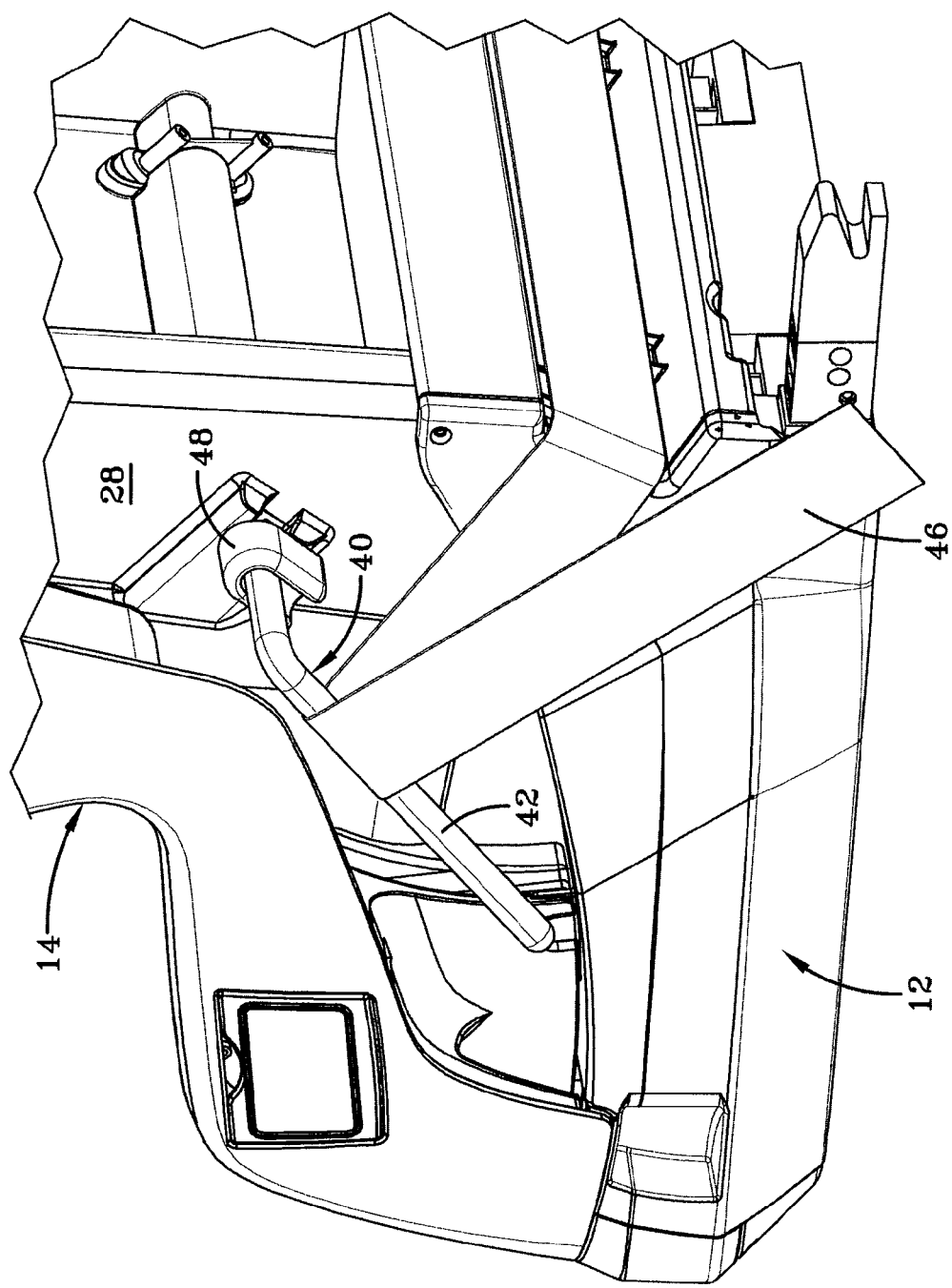
FIG. 4A is a close up perspective view of the child restraint system showing the lap belt anchor rod in an extended and unlocked position.
Figure 5:
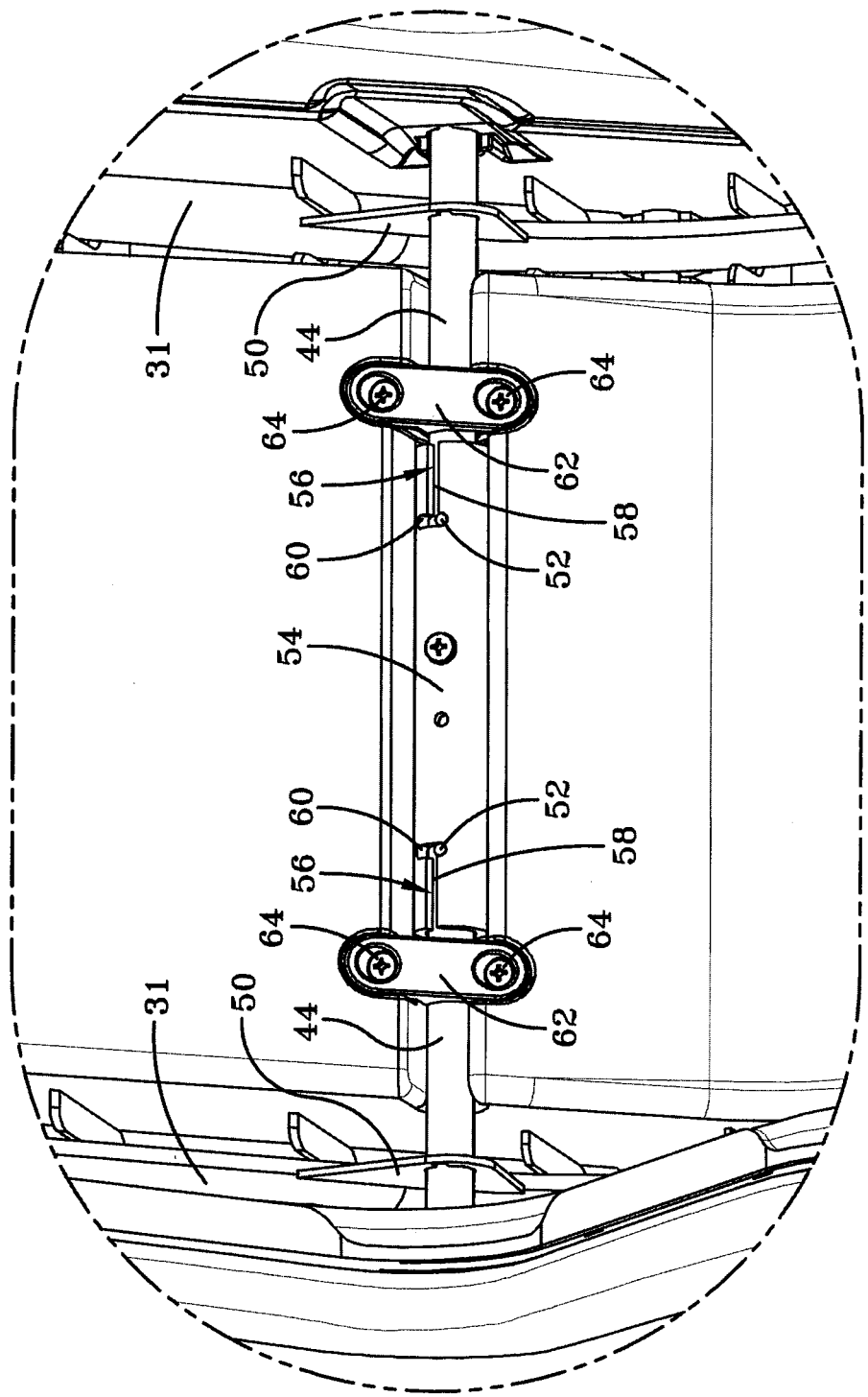
FIG. 5 is a perspective view of the child restraint system showing the lock sleeve of the anchor rod system.
Figure 6:
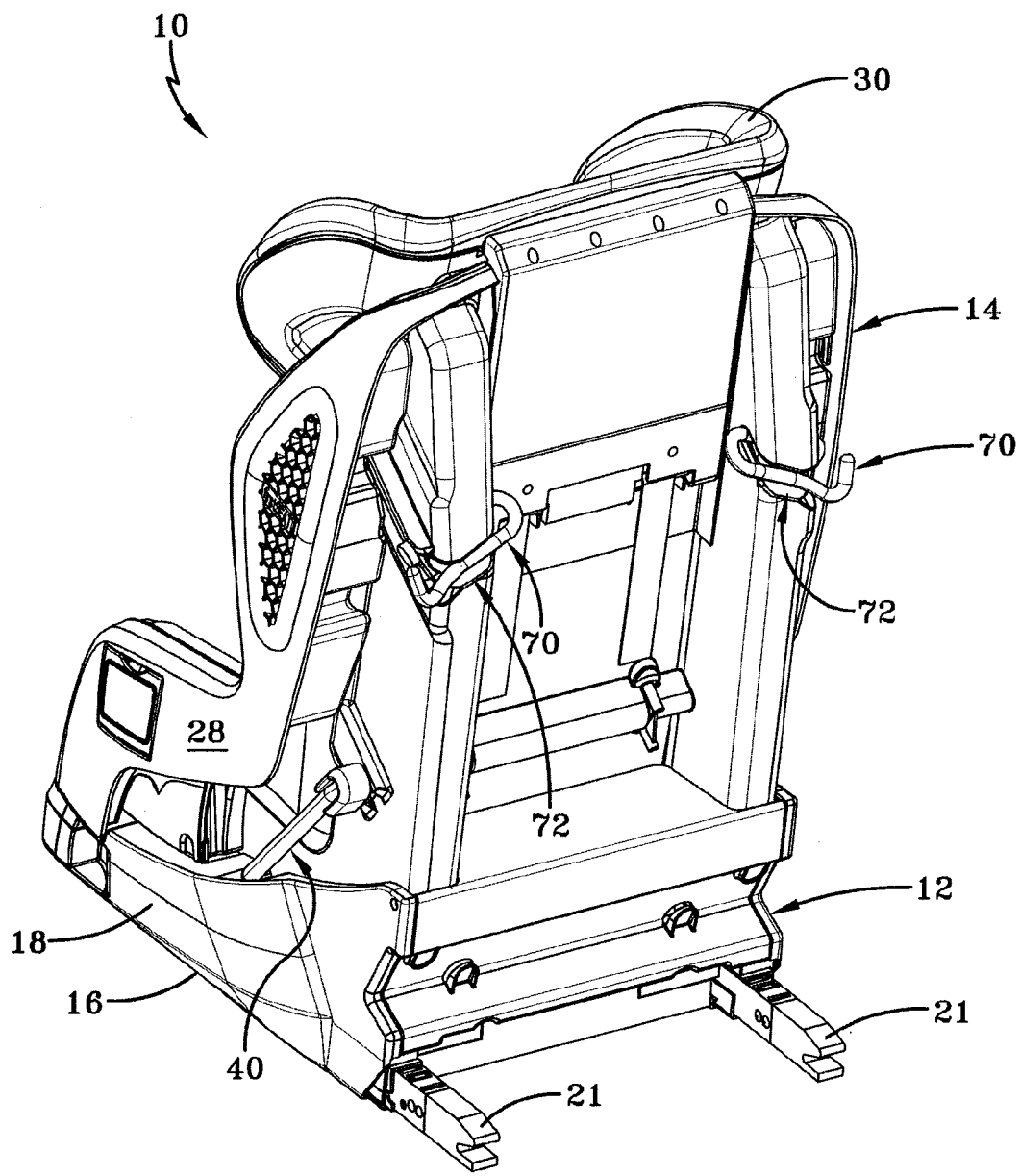
FIG. 6 is a rear perspective view of the child restraint system showing the shoulder belt anchor mechanisms.
Figure 7:
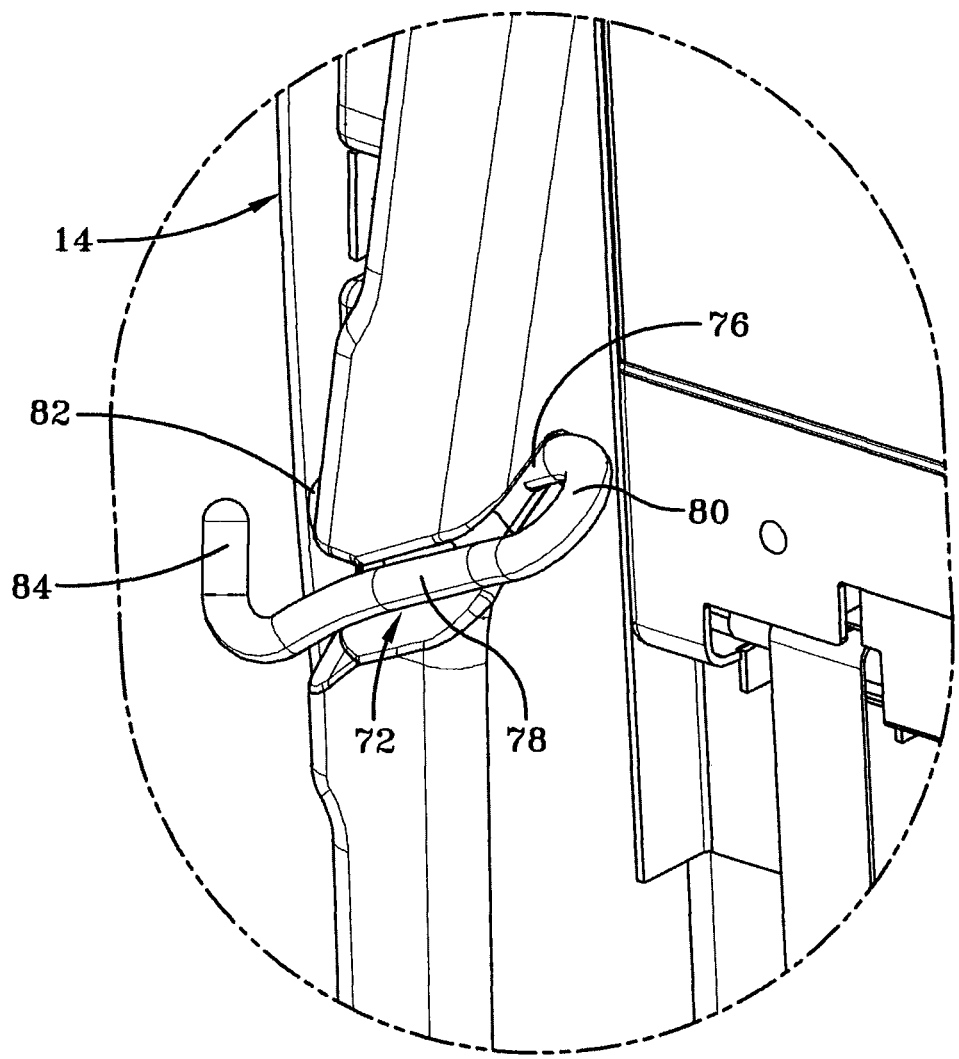
FIG. 7 is a close up perspective view of the shoulder belt anchor mechanisms.
Figure 8:
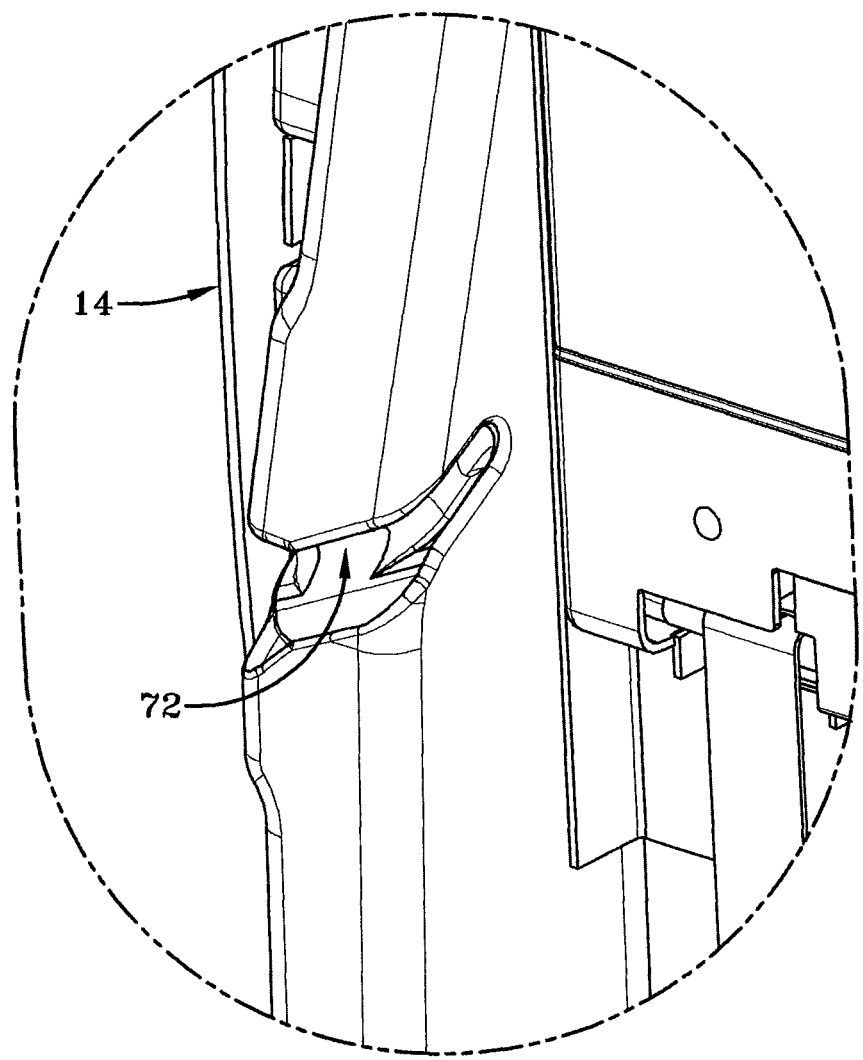
FIG. 8 is a close up perspective view of the recesses of the child restraint system with the shoulder belt anchor mechanism removed.

Anchor rod 40, when in a locked or use position, is prevented from significant lateral and rotational movement, as shown in FIGS. 4, 4A, and 5. FIG. 4 shows the anchor rod 40 in a first use position whereas FIG. 4A shows the anchor rod 40 in a second routing position. A top surface of base 12, seat sidewall 28, anchor rod stop 48 and pin 52 prevent significant movement of anchor rod 40, and allow the anchor rod 40 to serve as an anchor point for lap belt 46. During the removal of child restraint system 10 from a vehicle or installation of child restraint system 10 into a vehicle, anchor rod 40 may be moved laterally outward from side walls 28, and rotated upward to allow lap belt 46 to be positioned over or removed from the rod, as shown in FIG. 4A.

For installation with a vehicle seat belt 46, the anchor rod may be rotated within sleeve 54 to position pin 52 at the top end of the circumferentially extending portion 60 of lateral slot 56 creating an opening at the lower end of the first portion 42 of anchor rod 40 to allow insertion of the vehicle lap belt 46. In addition, the anchor rod 40 may be rotated slightly while within sleeve 54 to position pin 52 in alignment with the laterally extending portion 58 of slot 56. The anchor rod 40 may then be moved laterally outward from side walls 28 with pin 52 sliding in the laterally extending portion 58 of slots 56. Once pin 52 has cleared the end of slot 56, and first portion 42 has cleared anchor rod stop 48, the anchor rod may be rotated to facilitate installation or removal of the child restraint system 10. Retaining clip 62 and pin 52 prevent anchor rod 40 from being completely removed from side wall 28. Anchor rod 40 is returned to the locked position by reversing the steps discussed above. Forces applied by lap belt 46 when anchor rod 40 is in the locked position cause a rotational force to press pin 52 against the end of the circumferentially extending portion 60 of slot 56, and thereby further prevent unintended movement of anchor rod 40.

A vehicle lap belt routing system, as discussed above, and including an anchor rod 40, provides an improved anchoring system for the restraint system 10. In addition, the laterally and rotational movement of anchor rod 40 facilitates easy installation and removal of the child restraint system 10. Furthermore, the ability to route only the lap belt through the vehicle lap belt routing system provides for improved performance because it allows the belt to be tightened to a greater extent, and allows the lap belt anchor points to be positioned higher and further forward than traditional anchor points.

Referring now to FIGS. 6-9, child restraint system 10 includes a pair of shoulder belt anchor members 70. Each shoulder belt anchor member 70 is positioned within a recess 72 formed in the outer shell of seat body 14. Anchor members 70 are configured to allow a shoulder belt of a vehicle restraint system to be positioned therebehind and within recess 72. Each anchor member 70 extends through a bracket 74 secured to the frame 31 (FIG. 9) of child restraint system 10. Anchor member 70 is capable of limited rotation within recess 72 relative to the bracket 74.

Figure 9:
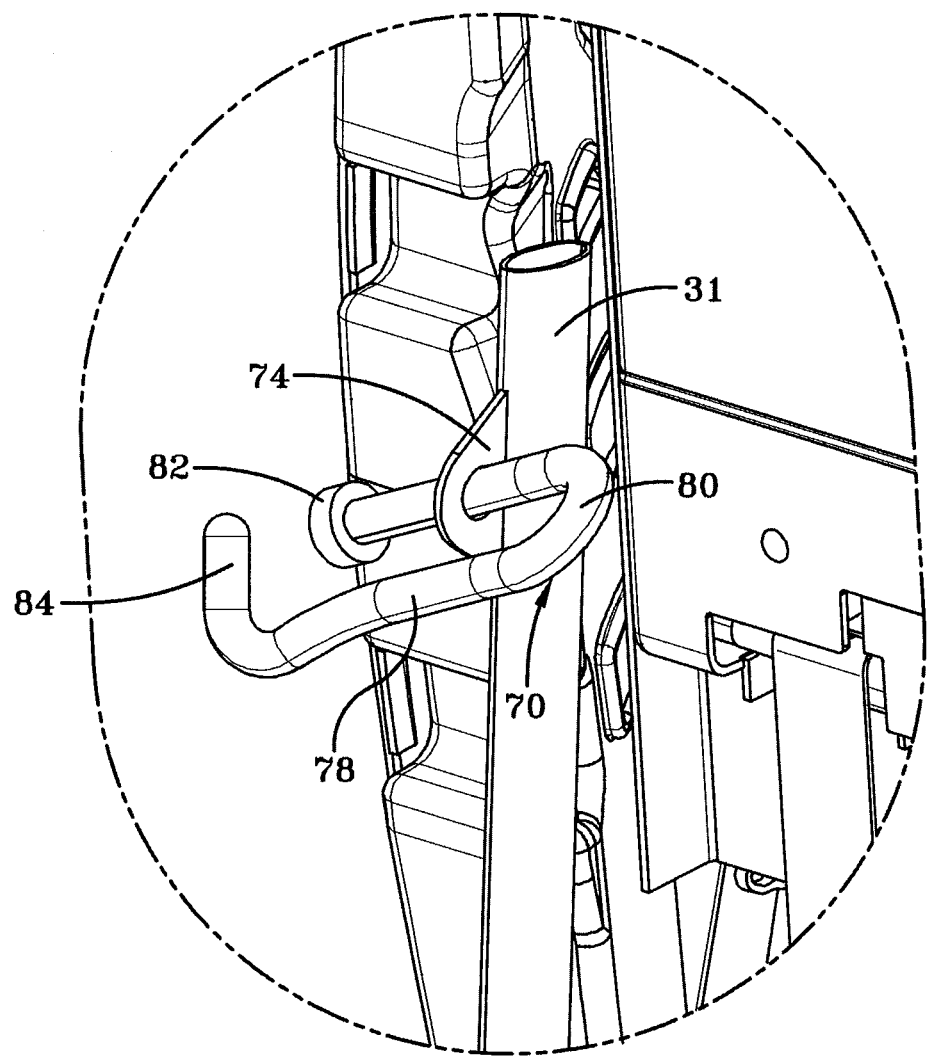
FIG. 9 is a perspective view of the child restraint system with the outer molding removed to show the shoulder belt anchor mechanism secured to the frame.

As best shown in FIG. 9, anchor member 70 includes a first leg 76 and a second leg 78. A hook portion 80 connects first leg 76 and second leg 78 and is generally U-shaped. First leg 76 and second leg 78 are generally parallel to one another, and an end cap 82 is provided at one end of first leg 76 opposite hook portion 80. End cap 82 prevents anchor member 70 from being removed from bracket 74. End cap 82 may be provided in any form known to those skilled in the art, and may be, for example, a nut received on a threaded portion of first leg 76.

Second leg 78 may be provided with an upwardly extending projection 84 at an end opposite hook portion 80. Projection 84 helps to prevent a shoulder belt of the vehicle restraint system from sliding out of anchor member 70. Second leg 78 may optionally angle away from first leg 76 as it extends away from hook portion 80 so as to facilitate insertion of the vehicle shoulder belt therein. For similar reason, recess 72 may be provided with angled and contoured surfaces to make positioning of the shoulder belt easier.

As will be appreciated by those skilled in the art, a shoulder belt of a vehicle restraint system may be fed over projection 84 and behind second leg 78 of anchor member 70, and may thereby act to restrain child restraint system 10. Due to the positioning of anchor member 70 in recess 72, and the resulting path of the shoulder belt as it travels into recess 72 and over second leg 78, pressure asserted on the shoulder belt will result in the anchor member engaging the shoulder belt and restricting further movement.

Figure 2:
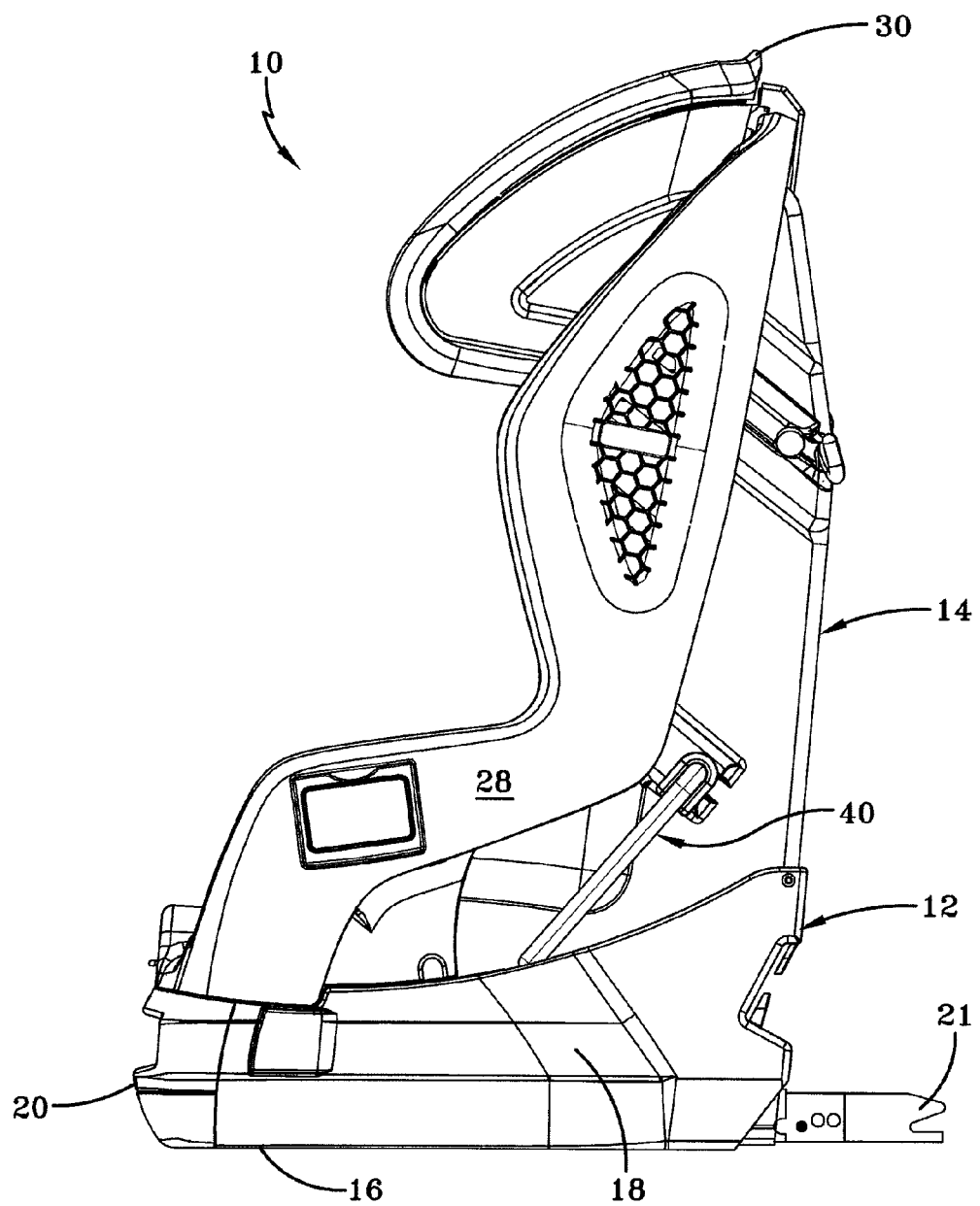
FIG. 2 is a side elevational view of the child restraint system of FIG. 1.
Figure 3:
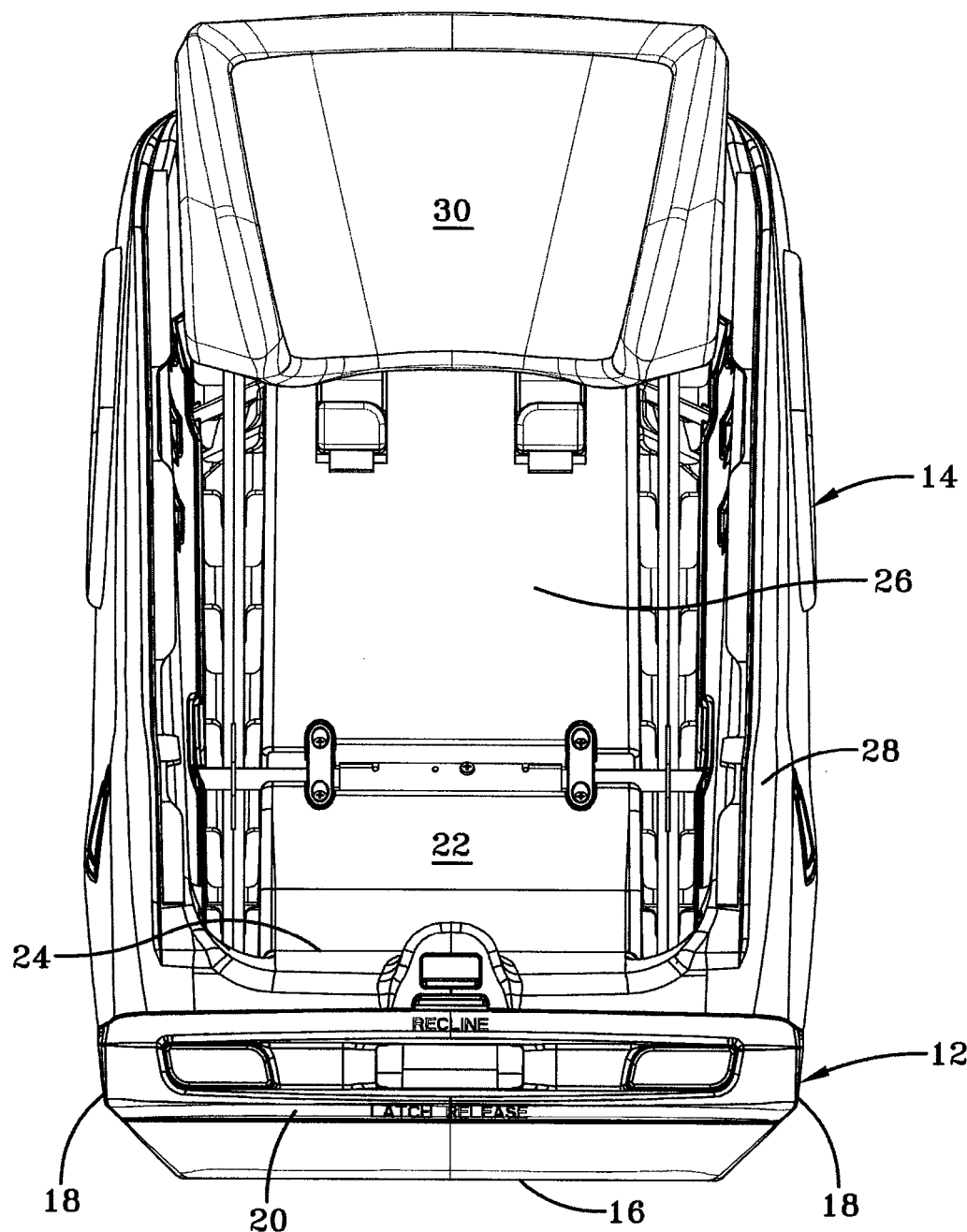
FIG. 3 is a front elevational view of the child restraint system of FIG. 1.
Figure 10:
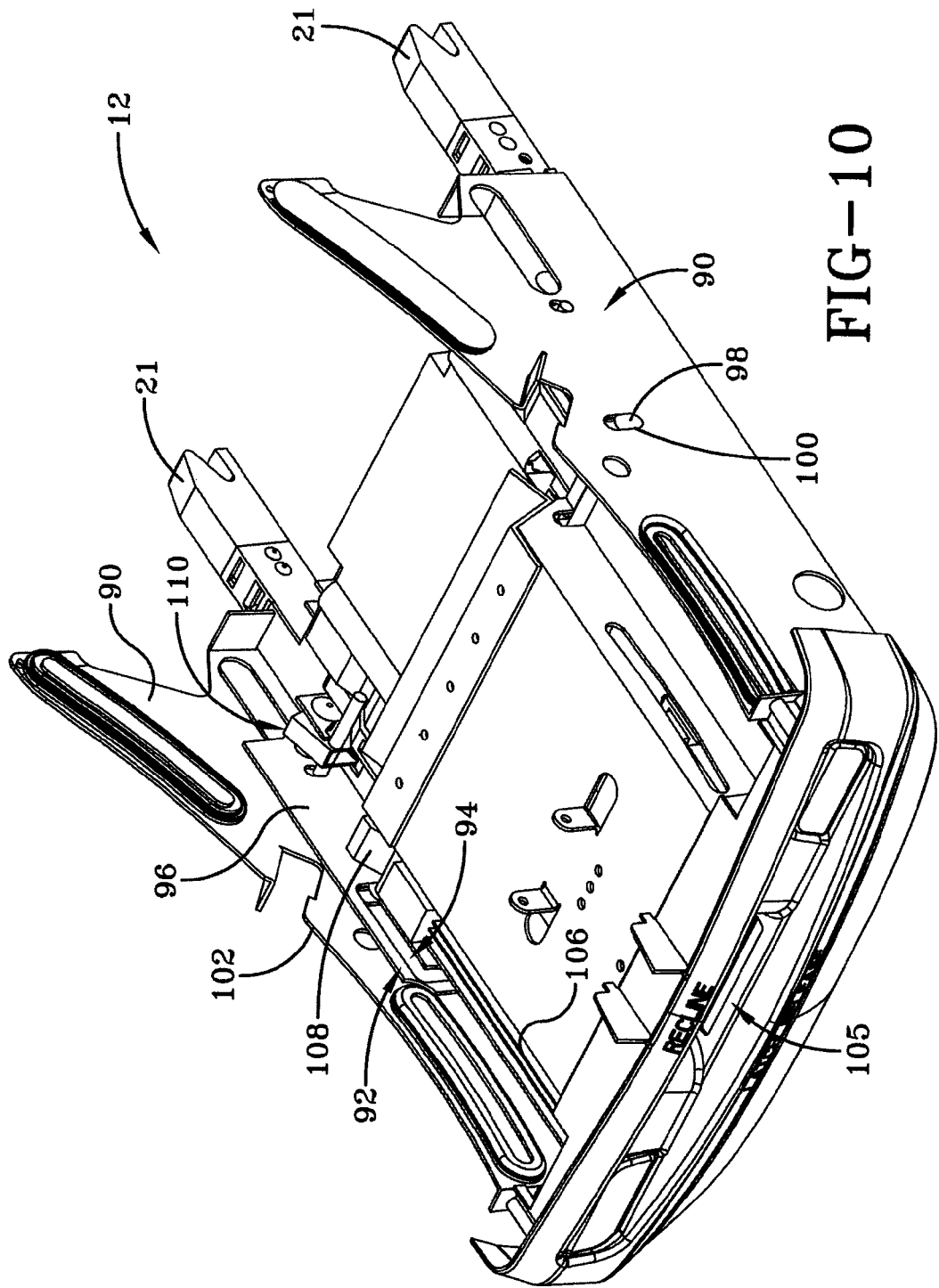
FIG. 10 is a perspective view of the base of the child restraint system with the outer molding removed.
Figure 11:
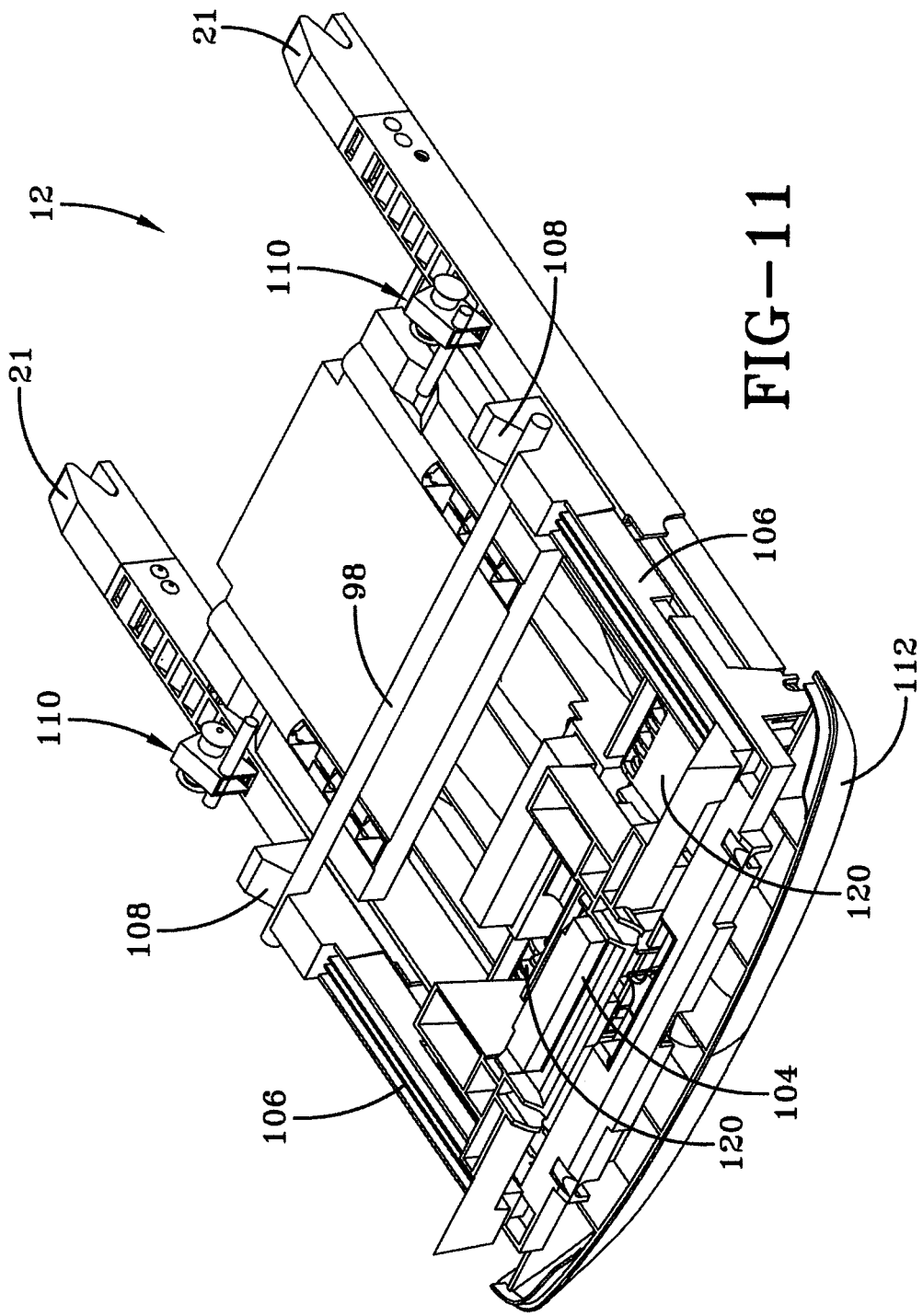
FIG. 11 is a perspective view of the base as shown in FIG. 10 with additional components removed to better illustrate the recline mechanism.
Figure 12:
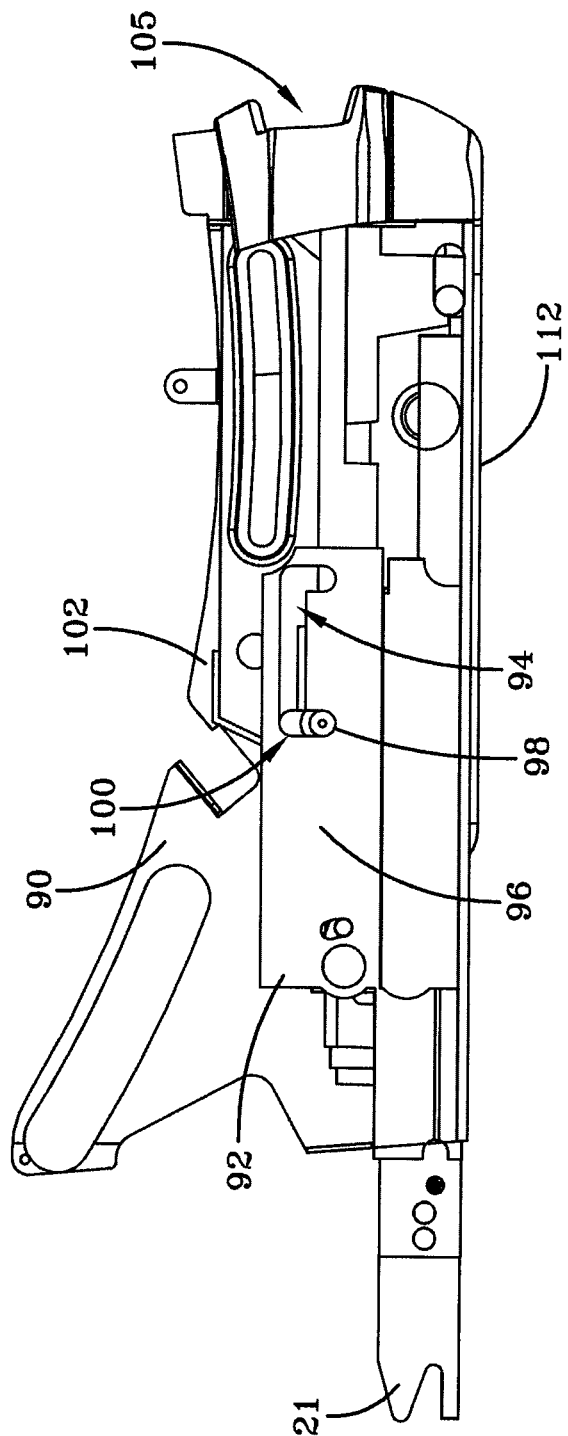
FIG. 12 is a side elevational view of the base as shown in FIG. 10 including the recline plate.
Figure 13:
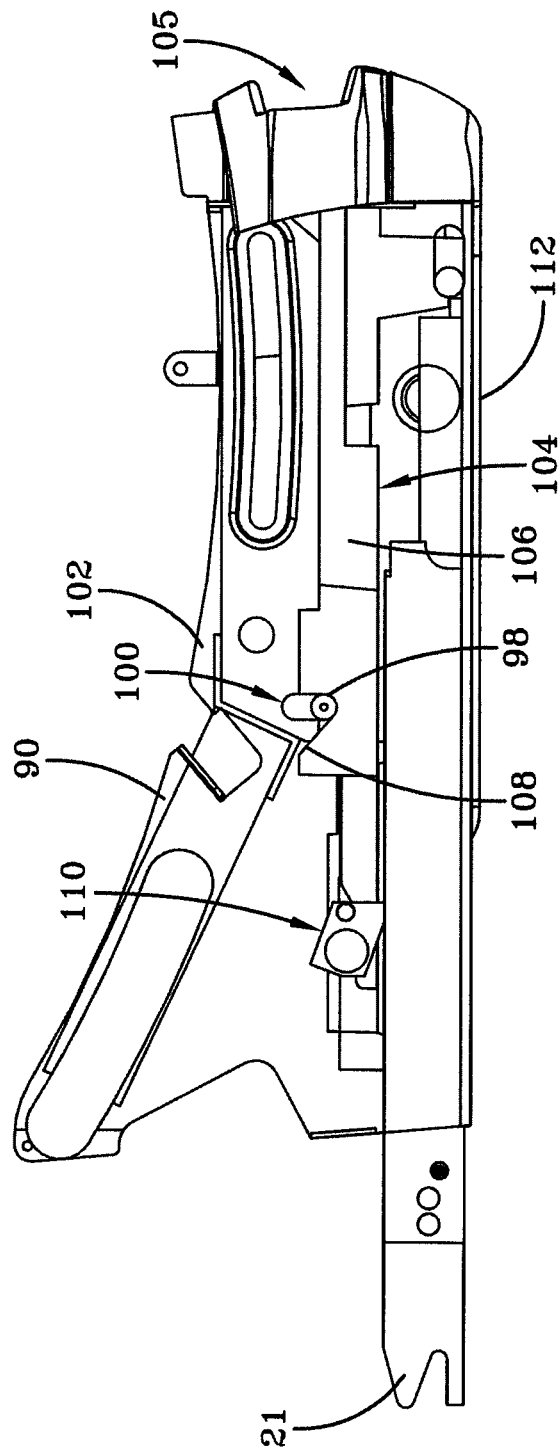
FIG. 13 is a side elevational view of the base of FIG. 12 with the recline plate removed.
Figure 14:
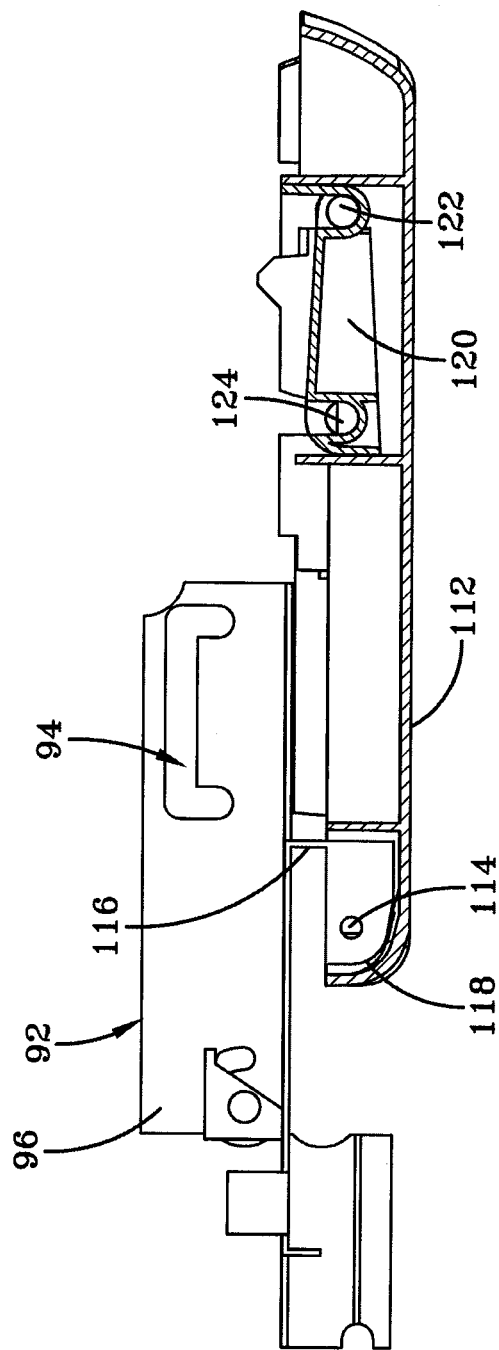
FIG. 14 is a sectional view of the recline mechanism of the present invention.
Figure 15:
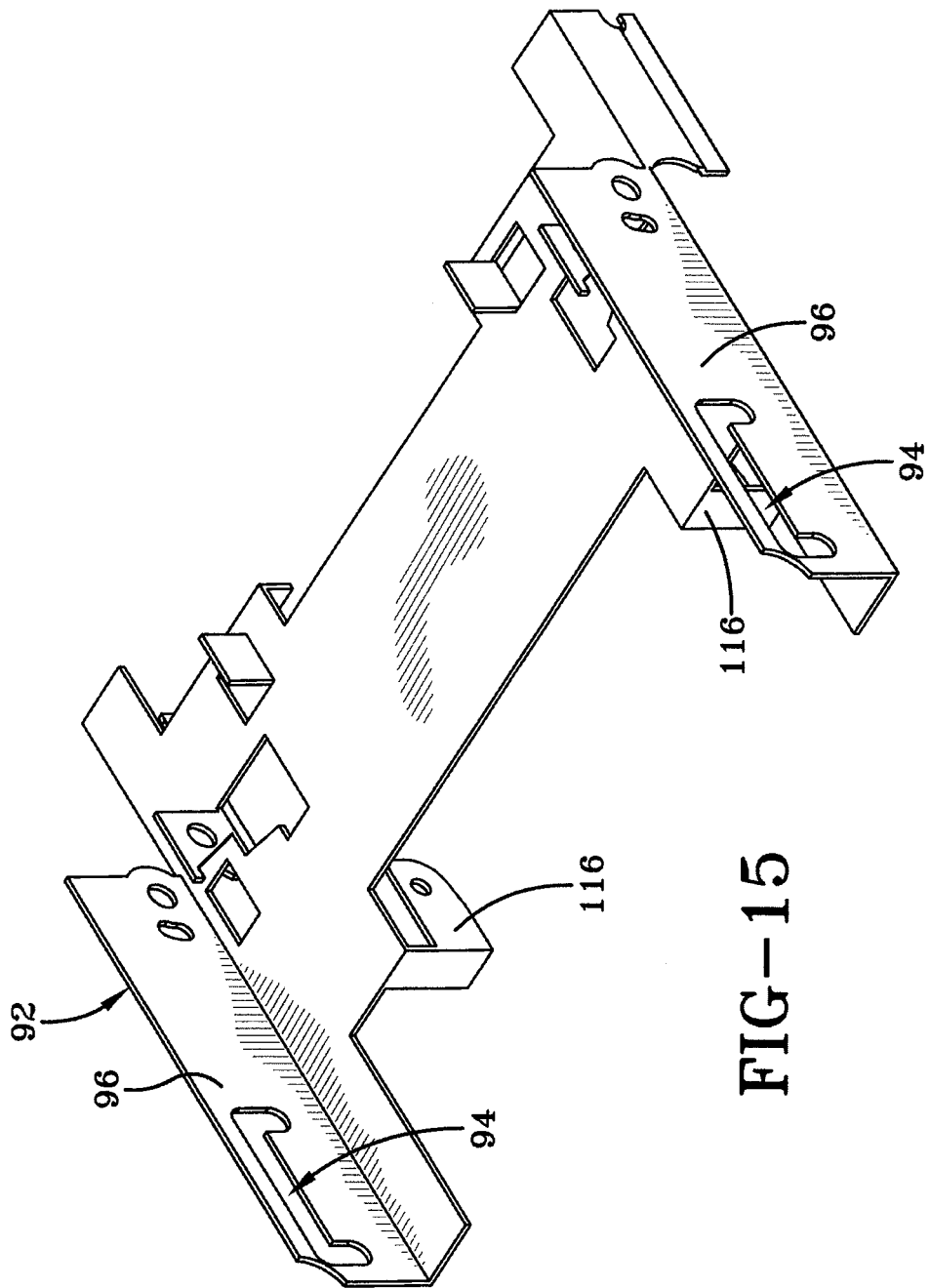
FIG. 15 is a perspective view of the recline plate of the recline mechanism of FIG. 14.
Figure 16:
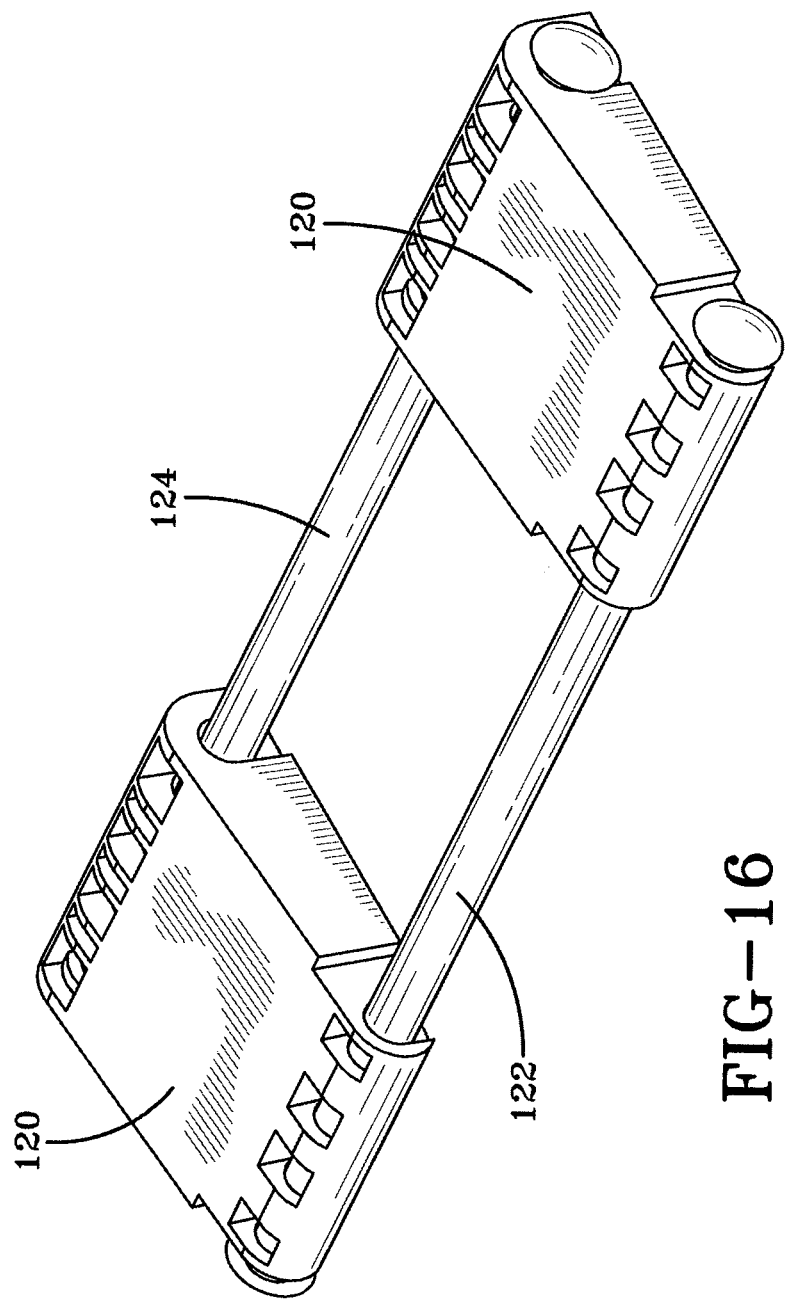
FIG. 16 is a perspective view of the link members and the connecting rods of the recline mechanism of FIG. 14.
Figure 17:
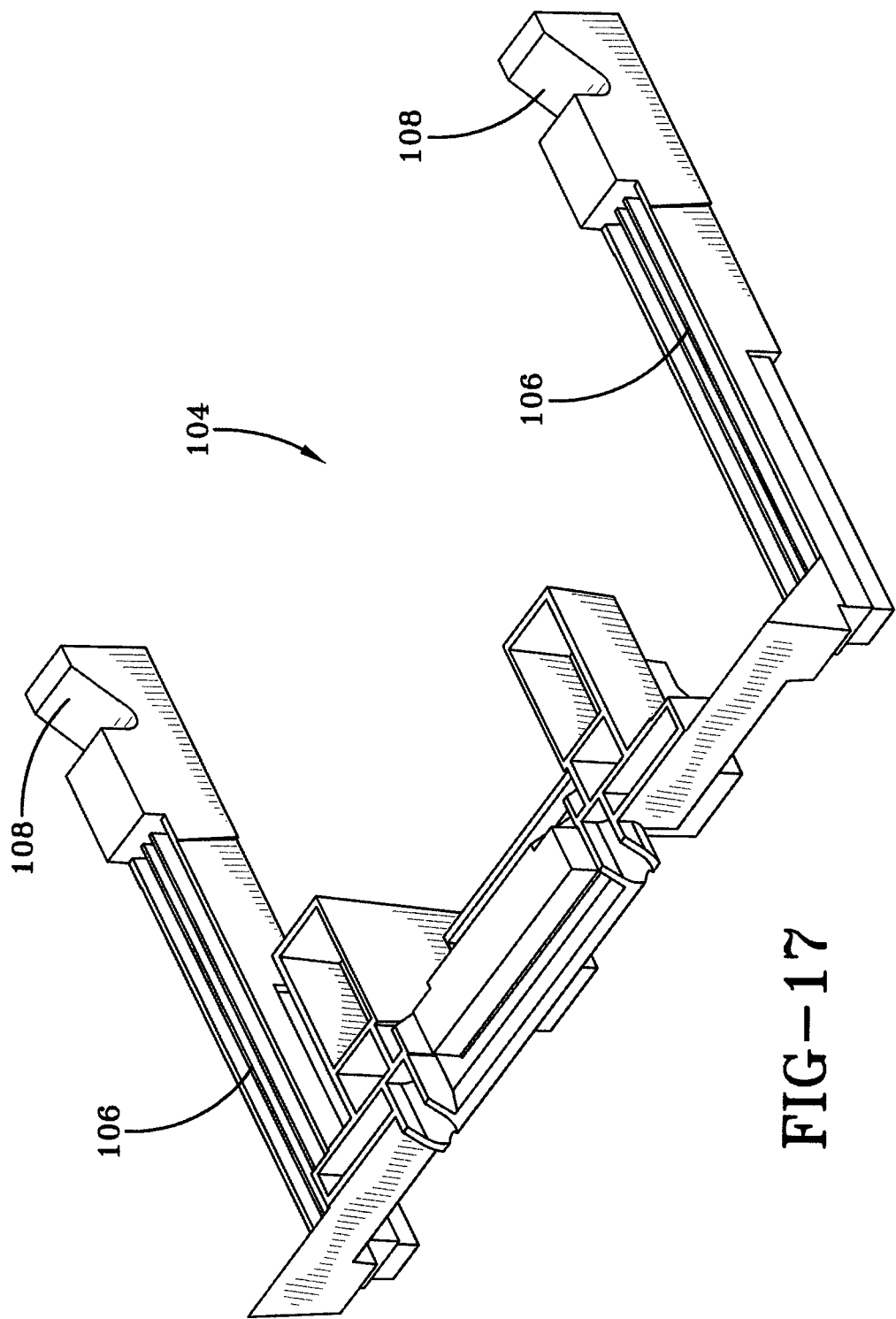
FIG. 17 is a perspective view of the handle and release arms of the recline mechanism.

Child restraint system 10 includes a recline mechanism that is adapted to allow the seat to recline without removing it from the vehicle. The components of the recline mechanism are housed within base 12, as shown in FIGS. 10-17. Base 12 includes a base plate 90 that provides structural support to the base. Base plate 90 is hidden behind a plurality of molded cover panels, as shown in FIGS. 1-3, to provide a more aesthetically appealing restraint system, and to protect the moving components within the base. The base 12 is shown in FIG. 10 with the molded cover panels removed to better illustrate the interaction of the recline mechanism components.

A recline plate 92 is provided in base 12 that is slidable in the forward and rearward directions relative to base plate 90. Recline plate 92 includes an inverted U-shaped slot 94 in each of opposing side panels 96. A release rod 98 traverses recline plate 92 and is received in the opposing slots 94. Release rod 98 also passes through vertically oriented slots 100 in opposing side panels 102 of base plate 90. A handle 104 is provided and is accessible through an opening 105 in the front surface 20 of base 12. Handle 104 includes laterally spaced release arms 106 extending rearwardly therefrom, each release arm 106 having a ramp 108 in a top surface thereof.

When handle 104 is pulled forward at opening 105, release arms 106 are caused to slide forward relative to recline plate 92 and base plate 90. The forward motion of release arms 106 causes ramps 108 to engage release rod 98 and move it vertically within vertical slots 100 in side panels 102. As release rod 98 moves up, it clears the lock position in the U-shaped slot 94 in each side panel 96, and is then capable of sliding forward or rearward relative to recline plate 92. Thus, the vertical end portions of the U-shaped slot 94 provide locked positions for the recline feature, and the handle 104, release arms 106 and ramps 108 provide a release mechanism for moving release rod 98 from the locked positions to allow recline plate 92 to slide relative to base plate 90. It is also contemplated that additional lock positions may be provided along the length of the U-shaped slots to allow for one or more intermediate recline positions, as will be appreciated by those skilled in the art.

Rigid latch members 21 are contained in the base 12 and base plate 90 and are locked in adjustment positions by a pawl assembly 110. Movement of release rod 98 into the unlocked position allows movement of recline plate 92 in a forward or rearward direction relative to base plate 90 and rigid latch members 21. Thus, as recline plate 92 moves forward relative to base plate 90 and rigid latch members 21, room is created between the vehicle seat and the seat back 26 to allow the seat body 14 to recline back. Conversely, when recline plate 92 moves rearward relative to base plate 90 and rigid latch members 21 the seat body 14 moves to an upright position and is positioned against the vehicle seat. This independent movement of recline plate 92 and rigid latch members 21 allows for the seat body 14 to be reclined without removing the child restraint system 10 from the vehicle.

A recline foot 112 is provided on the bottom surface 16 of base 12. Recline foot 112 is pivotally connected to recline plate 92 by a pivot rod 114 adjacent its rearward facing end. Pivot rod 114 is received in pivot brackets 116 extending from recline plate 92 and in a channel 118 in recline foot 112. Recline foot 112 is connected to base plate 90 by link members 120. A first rod 122 is received through one side of link members 120 and recline foot 112, and a second rod 124 is received through the opposite side of link members 120 and base plate 90. As will be appreciated by those skilled in the art, movement of the front end of recline foot 112 downward and away from base 12 results in pivoting of link members 120 about first and second rods 122 and 124. This pivoting movement is allowed by movement of release rod 98 rearward from the front locked position when unlocked by release arms 106.

It is thus evident that a child restraint system constructed as described herein accomplishes the objects of the present invention and otherwise substantially improves the art.

What is claimed is:

1. A child restraint system comprising a seat body having a seat bottom and a seat back, and first and second laterally spaced anchor rods carried by said seat back, said anchor rods being rotationally movable between a first use position and a second routing position and laterally movable relative to said seat body to facilitate routing of a vehicle lap belt around the anchor rods.

2. The child restraint system of claim 1, said anchor rods each including a first portion and a second portion extending generally orthogonally from said first portion.

3. A child restraint system comprising a seat body having a seat bottom and a seat back, first and second laterally spaced anchor rods carried by said seat back, said anchor rods being rotationally movable between a first use position and a second routing position to facilitate routing of a vehicle lap belt around the anchor rods, and a sleeve positioned on a rear surface of said seat back and having opposing open ends, said second portion of said first and second anchor rods being movably secured in said open ends of said sleeve.

4. The child restraint system of claim 3, said seat back having a frame, said anchor rods carried by said frame, said first portion of said first and second anchor rods positioned laterally outwardly from said seat back.

5. The child restraint system of claim 4, said seat body having a sidewall and further comprising an anchor rod stop positioned on said sidewall, said anchor rod stop adapted to limit rearward movement of a vehicle lap belt routed over said first portion of said anchor member.

6. The child restraint system of claim 3, said second portion of each of said anchor rods including an outwardly extending pin, and said sleeve including slots adjacent to each of said open ends, said pins being received in said slots to restrain movement of said anchor rods.

7. The child restraint system of claim 6, said slots in said sleeve being generally T-shaped with a laterally extending portion and a circumferentially extending portion, alignment of said pin with said laterally extending portion allowing for lateral movement of said anchor rods.

8. The child restraint system of claim 1, further comprising a recess in said seat back, and an anchor member carried by said seat back and positioned in said recess, said anchor member adapted to receive a vehicle shoulder belt to secure the child restraint system within a vehicle.

9. The child restraint system of claim 1, further comprising a base, a recline mechanism for repositioning said seat body relative to the vehicle seat on which it is installed between an upright position and a reclined position, and first and second adjustable rigid latch members extending from the rear of said base for securing said base to vehicle anchors, said recline mechanism including a base plate and a recline plate movable relative to said base plate, wherein movement of said recline plate relative to said base plate repositions said seat body.

10. A child restraint system comprising a seat body having a seat bottom and a seat back, a recess in the backside of said seat back, and an anchor member carried by said seat back and positioned in said recess, said anchor member adapted to receive a vehicle shoulder belt to secure the child restraint system within a vehicle.

11. The child restraint system of claim 10, further comprising a frame supporting said seat body, and a bracket secured to said frame, said anchor member carried by said bracket.

12. The child restraint system of claim 10, further comprising a second anchor member, said second anchor member being spaced from said anchor member.

13. The child restraint system of claim 10, said anchor member having a first leg, a second leg, and a hook portion connecting said first and second legs.

14. The child restraint system of claim 13, further comprising an end cap positioned on an end of said first leg opposite said hook portion, said end cap preventing removal of said anchor member from said seat back.

15. The child restraint system of claim 14, wherein said end cap is removably secured to said first leg.

16. The child restraint system of claim 13, further comprising an upwardly extending projection extending from an end of said second leg opposite said hook portion, said upwardly extending projection preventing the vehicle shoulder belt from sliding out of said anchor member.

17. The child restraint system of claim 13, wherein said second leg is angled relative to said first leg to facilitate insertion of a vehicle shoulder belt over said anchor member.

18. The child restraint system of claim 10, wherein said recess includes angled and contoured surfaces adapted to facilitate insertion of the vehicle shoulder belt therein.

19. The child restraint system of claim 10, further comprising a base, a recline mechanism for repositioning said seat body relative to the vehicle seat on which it is installed between an upright position and a reclined position, and first and second adjustable rigid latch members extending from the rear of said base for securing the base to vehicle anchors, said recline mechanism including a base plate and a recline plate movable relative to said base plate, wherein movement of said recline plate relative to said base plate repositions said seat body.

20. A child restraint system comprising a base, a seat body having a seat bottom and a seat back, a recline mechanism for repositioning said seat body relative to the vehicle seat on which it is installed between an upright position and a reclined position, and first and second adjustable rigid latch members extending from the rear of said base for securing the base to vehicle anchors, said recline mechanism including a base plate connected to said rigid latch members and a recline plate movable relative to said base plate, wherein movement of said recline plate relative to said base plate repositions said seat body.

21. The child restraint system of claim 20, said base plate positioned within said base and having opposing sidewalls, said recline plate including opposing sidewalls, said sidewalls of said recline plate including locking slots having a generally inverted U-shape, and said sidewalls of said base plate including approximately vertically oriented slots.

22. The child restraint system of claim 21, said recline mechanism further comprising a handle, laterally spaced release arms extending from said handle, ramped surfaces on each of said release arms, and a release rod traversing said recline plate and carried by said release arms.

23. The child restraint system of claim 22, said release rod being received in each of said slots in said recline plate and each of said generally vertically oriented slots in said base plate, wherein movement of said handle causes movement of said release arms and said ramped surfaces relative to said base plate, thereby causing said ramped surfaces to engage said release rod and move it upward in said slots to allow movement of said recline plate relative to said base plate.

24. The child restraint system of claim 20, further comprising a pawl assembly connecting said rigid latch members to said base plate within said base, said pawl assembly adapted to allow adjustment of the length of said rigid latch members.

25. The child restraint system of claim 20, further comprising a recline foot on a bottom surface of said base, said recline foot being pivotally connected to said recline plate.

26. A child restraint system comprising:
- a base;
- a seat body having a seat bottom and a seat back;
- first and second laterally spaced anchor rods carried by said seat back, said anchor rods being pivotally movable between a first use position and a second routing position to facilitate routing and removal of a vehicle lap belt around the anchor rods;
- a recess in said seat back;
- an anchor member carried by said seat back and positioned in said recess, said anchor member having a first leg, a second leg oriented generally parallel to said first leg, and a hook portion connecting said first and second legs, said anchor member adapted to receive a vehicle shoulder belt thereon;
- a recline mechanism that allows repositioning of said seat body relative to the vehicle seat on which it is installed between a reclined position and an upright position, said recline mechanism including a recline plate and a base plate; and
- first and second adjustable rigid latch members extending from a rear of said base, said rigid latch members adapted to be secured to vehicle anchors.

\* \* \* \* \*